May 29, 1934.　　　　C. L. SNYDER　　　　1,960,556
SNAP FASTENER
Filed March 20, 1933
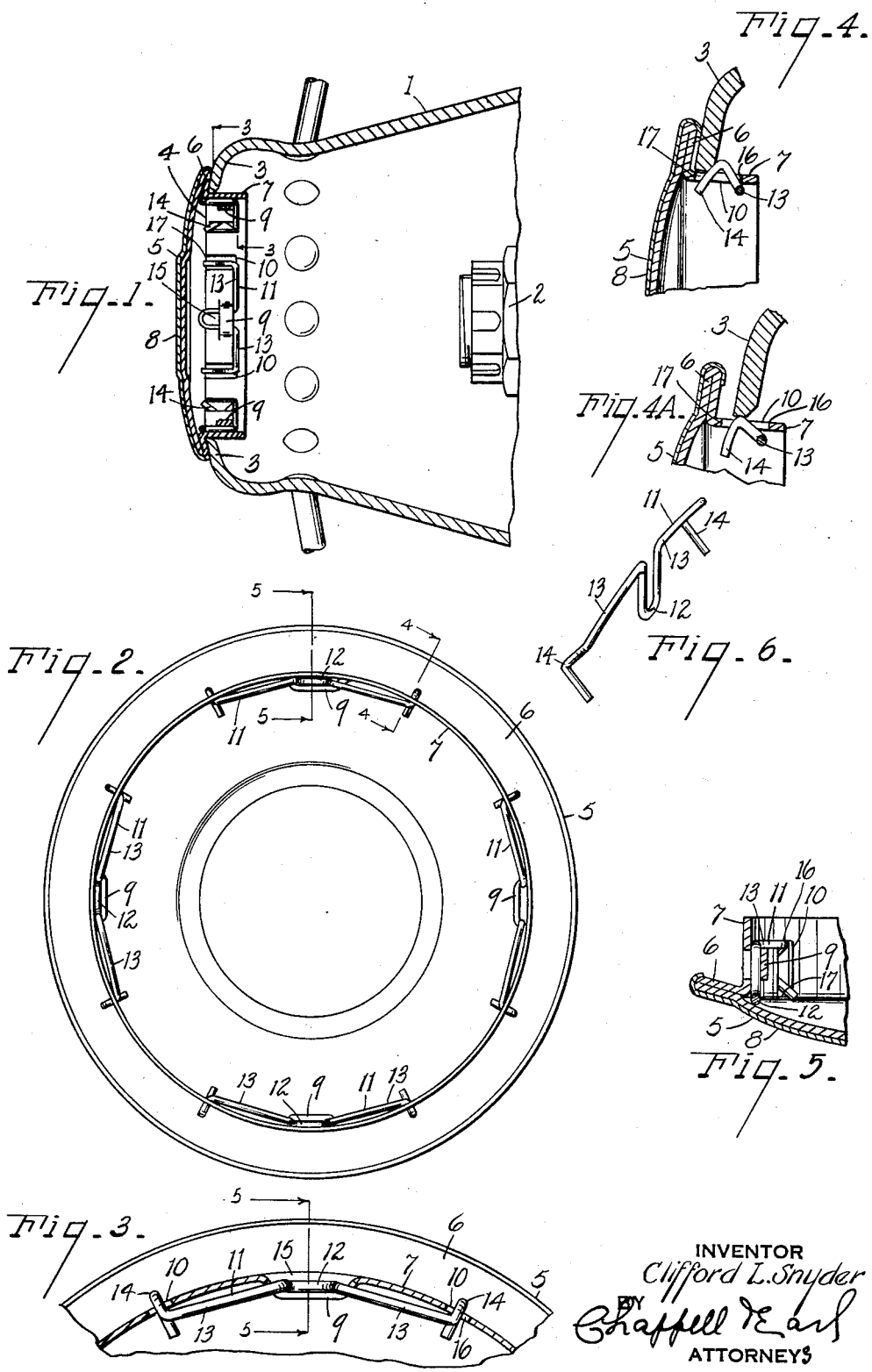
INVENTOR
Clifford L. Snyder
BY
Chappell Earl
ATTORNEYS Patented May 29, 1934

1,960,556

UNITED STATES PATENT OFFICE 1,960,556

SNAP FASTENER

Clifford L. Snyder, Detroit, Mich., assignor to L. A. Young Spring & Wire Corporation, Detroit, Mich.

Application March 20, 1933, Serial No. 661,798

4 Claims. (Cl. 301—108)

The main objects of this invention are:

First, to provide an improved snap fastener for retaining hub caps and motor vehicle wheel hub shells and the like in assembled relation.

Second, to provide a device of this character which can be easily secured in place and readily removed therefrom.

Third, to provide a fastener for use with a cylindrical flange, the fastener being in the form of a spring wire member having a central loop and opposed circumferentially extending spring arms terminating in lateral A-shaped keepers projecting through transverse slots in the flange so that a torsional spring action of the wire arms is brought into play by the retraction of the keepers.

Fourth, to provide a device of this character wherein the arms and keepers are related to the slots in such manner that an added frictional component is introduced when the hub cap is being withdrawn.

Fifth, to provide a hub cap equipped with fasteners which when engaged with the hub shell will effectively retain the cap in fixed position with respect to the hub shell.

Sixth, to provide a fastener having the above desirable features and characteristics and which is extremely simple in construction, economical to manufacture and durable and effective in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary section of a motor vehicle wheel embodying the features of my invention.

Fig. 2 is a rear elevation of the hub cap.

Fig. 3 is an enlarged fragmentary section on a line corresponding to line 3—3 of Fig. 1.

Figure 4 is an enlarged fragmentary detail section on a line corresponding to line 4—4 of Fig. 3.

Fig. 4A is a view similar to Fig. 4, showing the relation of the parts during the insertion of the cap.

Fig. 5 is an enlarged fragmentary section on a line corresponding to line 5—5 of Figs. 2 and 3.

Fig. 6 is a perspective view of a spring wire member.

Referring to the embodiment of my invention illustrated by the drawing, 1 represents the hub shell which is secured in any suitable manner to the wheel hub designated generally by the numeral 2, the shell having an inturned annular flange 3 at the relatively large opening 4.

The hub cap 5 of the embodiment illustrated is formed of sheet metal and is fashioned to provide an annular bead and a cylindrical inset flange 7 adapted to fit into the opening 4 of the hub shell. The cap is provided with an ornamental finishing plate or shell 8 of relatively thin material which is embossed or enameled to present the desired appearance, the ornamental plate overlapping the exposed portions of the cap. The plate extends far enough under the bead 6 to space the latter slightly from the hub 1, thus giving some added tension between the keepers 14 and the inner portion of the bead.

The cylindrical flange 7 is circumferentially slit and parts struck inwardly to provide loop-like circumferential portion 9 which is inwardly offset centrally of each pair of transverse slots 10, 10 in the flange. A spring wire catch member 11 is associated with each pair of slots and is formed of wire to provide a central loop 12 and opposed spring arms 13 terminating in lateral A-shaped keepers 14. In assembling the spring wire member with the hub cap, the loop 12 is inserted on the inner side of the flange and under the loop-like portion 9 to a sufficient depth so that the rounded end of the loop 12 projects beyond the inwardly offset portion 9. The lateral keepers 14 are then moved inwardly to lie within the arc of the flange. Then by pressing downward on the spring wire member 11 the loop 12 is moved further through the opening 15 until the arms 13 rest upon the edge of the inwardly offset portion 9. The lateral keepers 14 are then moved downward sufficiently to allow them to snap through the slots 10 in the flange wherein they bear upon the inner edges 16 of the slots 10. The keepers 14 are spaced from the outer edges 17 of the slots 10.

The member 11 is formed from a length of spring wire as shown in Fig. 6. The opposed arms 13 are approximately in line and are of substantially equal length. The loop 12 is disposed at an angle to the arms 13 and in substantially the same plane with its sides or legs substantially parallel to each other. The angular lateral keepers 14 are arranged in substantially normal relation to the arms 13, but are arranged in diverging relation relative to each other.

In operation, the hub cap is moved toward the hub shell so that the flange 7 enters the shell opening. Upon continued inward movement, see Fig. 4A, the keepers 14 engage and are moved inwardly by the edge of the hub shell opening through the slots 10 of the cap flange 7, the only resistance to such retraction of the keepers being the torsional and bending elasticity of the arms 13 of the spring members 11 together with some friction between the shell and the keepers. As the inward movement continues, the edge of the wheel hub opening passes the extended portion of the spring keepers and they move back into locking position as shown in Fig. 4.

Similarly, the removal of the cap is resisted by the spring tension of the catch arms and the torsional resistance as the outward pull on the cap causes the edge of the hub shell opening to move the keepers inwardly and this tends to twist the catch arms or apply torsion thereto until the edge of the shell opening reaches the crowns of the keepers. However, an added frictional component is introduced when the cap is being withdrawn by virtue of the engagement of the keepers with the inner edges 16 of the slots 10, making removal more difficult than insertion.

With the parts thus arranged, the force required to assemble the cap with the shell and the force required to remove the cap from the shell may be varied within wide limits to suit conditions. In addition to the above advantage, my improved fastener is extremely simple and economical in its parts and assembly. While I have shown and described my fastener in connection with a hub cap assembly, it will be appreciated by those skilled in the art that it is applicable to similar relations where parts are removably secured together in assembled relation.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent is:

1. An article of manufacture comprising a hub cap including an annular flange having pairs of circumferentially spaced transverse slots and loop-like portions struck inwardly from the flange centrally of each pair of slots and opening axially of the hub cap, a spring wire member associated with each pair of slots and having a central loop arranged on the inner side of the flange and engaged under said in-struck portion of the flange, and opposed cord-like spring arms terminating in laterally disposed keepers projecting through said slots.

2. The combination of a hub cap having an annular hub engaging flange provided with spaced transverse slots and with an internal axially opening loop disposed centrally between said slots, and a wire catch member comprising a pair of spring arms connected by a laterally disposed loop engaged within said loop of said flange with the spring arms under tension, said arms terminating with laterally disposed inwardly projecting crowned keepers disposed through the slots of the flange.

3. An article of manufacture comprising a closure provided with a cylindrical flange having pairs of circumferentially spaced transverse slots and an inwardly struck portion between each pair of slots and a spring wire catch member arranged on the inner side of the flange and having a central loop engaged under the said inwardly struck portion, and opposed cord-like spring arms terminating in laterally keepers projecting through the slots.

4. An article of manufacture comprising a closure member provided with an annular flange having a pair of spaced transverse slots and an internal axially opening loop between the pair of slots, and a spring wire catch member arranged on the inner side of the flange and having a central loop engaged under said loop of the flange, and opposed spring arms terminating in keepers projecting through said slots, the loop of the catch being engaged with the loop of the flange with the arms under tension.

CLIFFORD L. SNYDER.